United States Patent [19]

Fritzler

[11] Patent Number: 5,628,212
[45] Date of Patent: May 13, 1997

[54] ANTI-THEFT DEVICE FOR IMMOBILIZING A WHEEL OF A MOTOR VEHICLE

[76] Inventor: Ulrich Fritzler, 65-15 Booth St., Rego Park, N.Y. 11374-4155

[21] Appl. No.: 380,288

[22] Filed: Jan. 30, 1995

[51] Int. Cl.⁶ .................................................. B60R 25/00
[52] U.S. Cl. ........................... 70/19; 70/226; 188/32
[58] Field of Search ........................... 70/14, 18, 19, 70/225, 226, 237; 188/32, 4 R, 36

[56] References Cited

U.S. PATENT DOCUMENTS

| | | |
|---|---|---|
| 998,369 | 7/1911 | McKenzie . |
| 1,169,525 | 1/1916 | Bixby et al. . |
| 1,376,114 | 4/1921 | Raney ............................ 188/32 |
| 2,449,033 | 9/1948 | Younglove . |
| 3,695,071 | 10/1972 | West ............................ 70/18 X |
| 3,828,590 | 8/1974 | Thiebault ........................ 70/19 |
| 4,031,983 | 6/1977 | Lentini ........................... 188/32 |
| 4,159,731 | 7/1979 | Dyrdahl ........................ 152/228 |
| 4,649,724 | 3/1987 | Raine ........................... 70/237 X |
| 4,723,426 | 2/1988 | Beaudoin ...................... 70/14 |
| 4,804,070 | 2/1989 | Bohler ........................ 70/14 X |
| 4,819,462 | 4/1989 | Apsell ........................... 70/14 |
| 4,833,442 | 5/1989 | Von Heck ................... 70/226 X |
| 5,137,121 | 8/1992 | Leonard ...................... 70/18 X |
| 5,247,815 | 9/1993 | Caldwell ..................... 70/14 X |

FOREIGN PATENT DOCUMENTS

| | | | |
|---|---|---|---|
| 584589 | 2/1925 | France ........................ 70/18 |
| 2520683 | 8/1983 | France ........................ 70/226 |
| 0289746 | 11/1989 | Japan ......................... 188/32 |
| 2180806 | 4/1987 | United Kingdom .......... 70/237 |
| 2184276 | 6/1987 | United Kingdom .......... 188/32 |

*Primary Examiner*—Lloyd A. Gall
*Attorney, Agent, or Firm*—Michael I. Kroll

[57] ABSTRACT

An antitheft device for a motor vehicle comprising a base adapted to rest longitudinally upon a tread of a tire on the motor vehicle. A facility is for securing the base to the tire. A structure is connected between the base and the securing facility for retaining the tire in a stationary position upon a road surface, so that the tire will not rotate, to prevent the motor vehicle from being driven away.

30 Claims, 4 Drawing Sheets

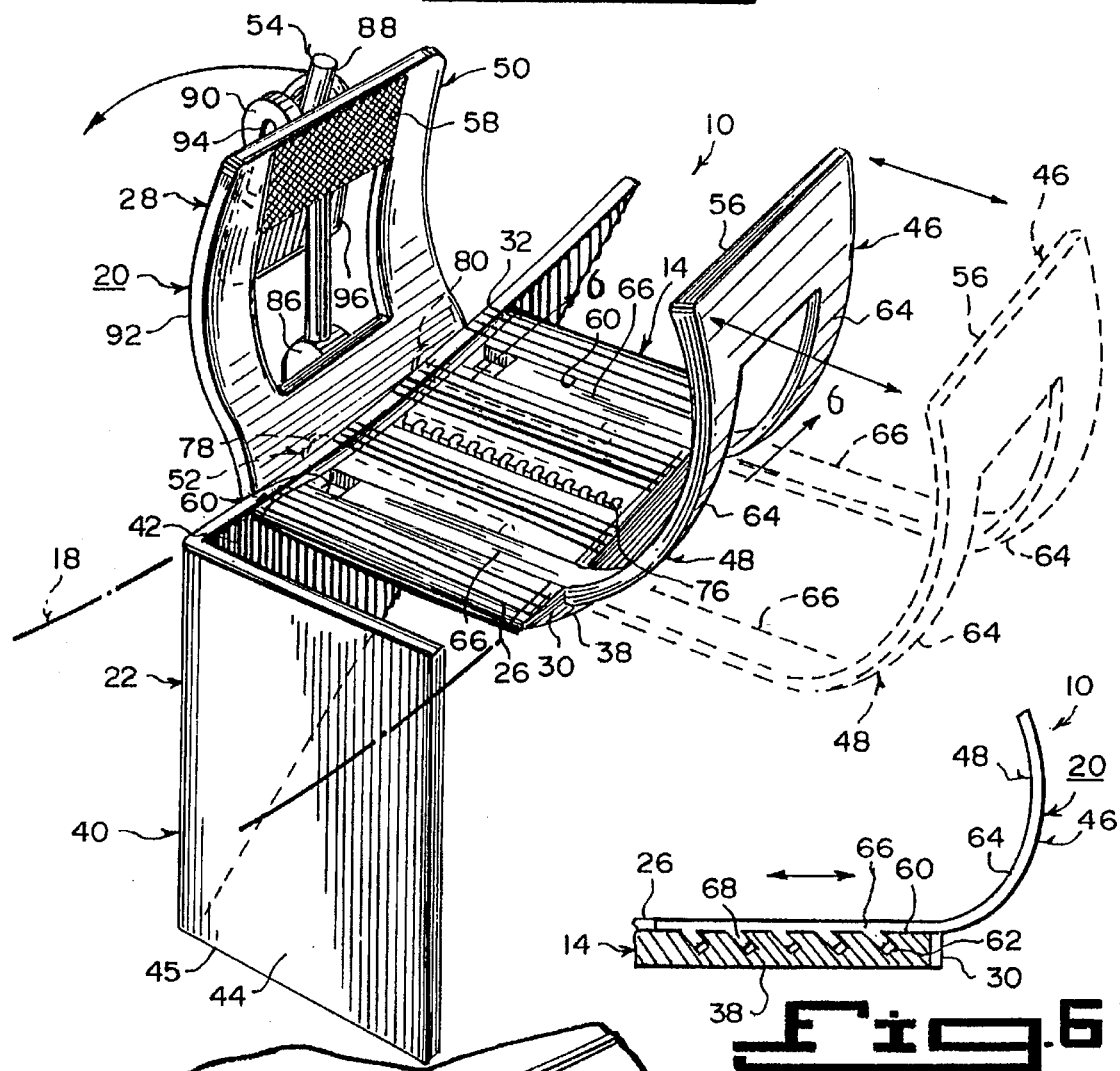
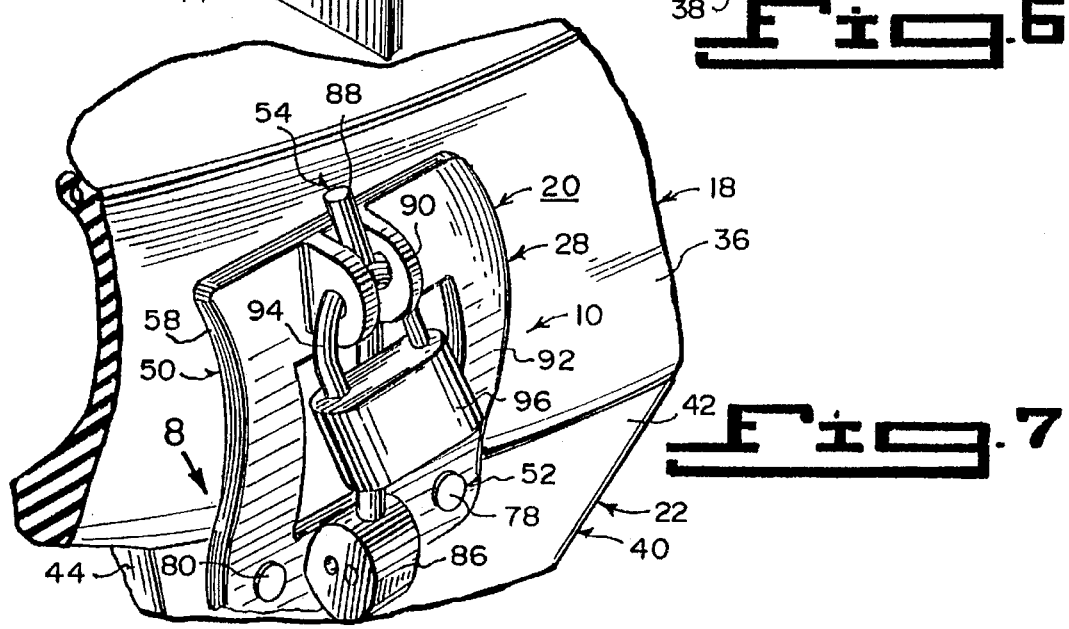

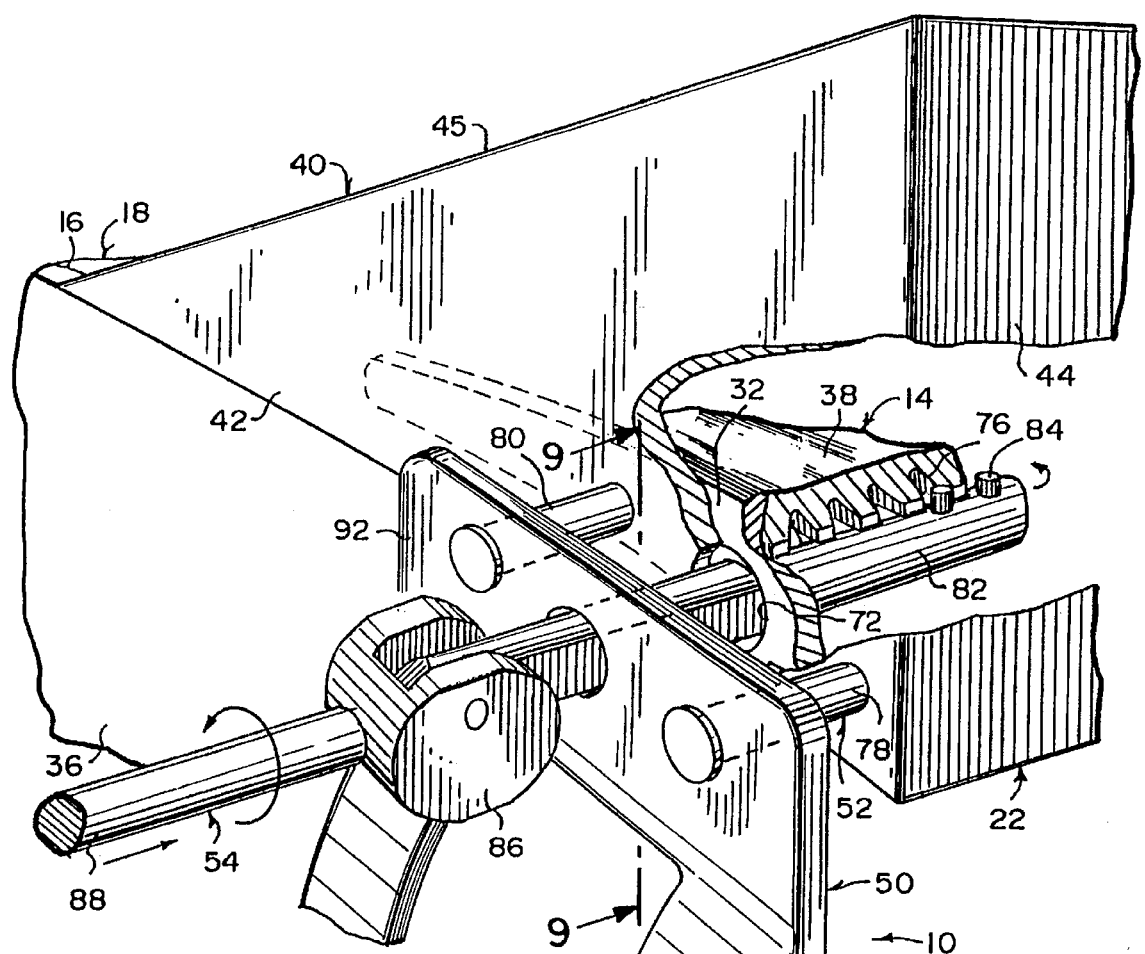
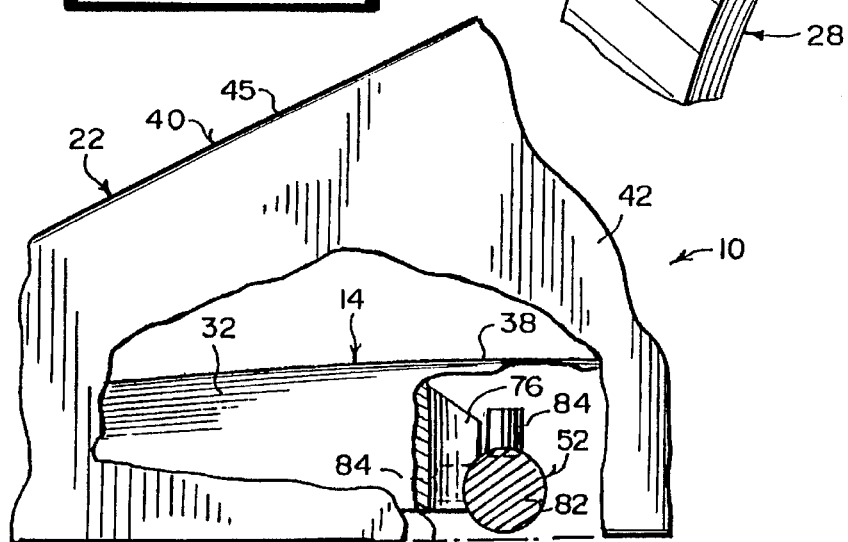

1

ANTI-THEFT DEVICE FOR IMMOBILIZING A WHEEL OF A MOTOR VEHICLE

BACKGROUND OF THE INVENTION

1. Field of the Invention

The instant invention relates generally to theft deterrent systems and more specifically it relates to an antitheft device for a motor vehicle.

2. Description of the Prior Art

Numerous theft deterrent systems have been provided in prior art that are adapted to be installed in motor vehicles to help stop thieves from stealing the motor vehicles. While these units may be suitable for the particular purpose to which they address, they would not be as suitable for the purposes of the present invention as heretofore described.

SUMMARY OF THE INVENTION

A primary object of the present invention is to provide an antitheft device for a motor vehicle that will overcome the shortcomings of the prior art devices.

Another object is to provide an antitheft device with a right angle triangular shaped bracket that is attached to a tire of the motor vehicle to retain the tire in a stationary position upon a road surface, so that the tire will not rotate to prevent the motor vehicle from being driven away.

An additional object is to provide an antitheft device that contains a clamping structure for the right angle triangular shaped bracket, that can quickly attach to and detach from the side walls of the tire and be adjustable thereto in order to fit different sized tires.

Still an additional object is to provide an antitheft device which applies prssure against both sides of the tire in order to secure the device to the tire, that amount of pressure being pre-determined so as to prevent the side wall of the tire from becoming dislodged from the driven wheel.

A further object is to provide an antitheft device that is simple and easy to use.

A still further object is to provide an antitheft device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein:

FIG. 5 is a perspective view taken in the direction of arrow 5 in FIG. 2.

FIG. 6 is a cross sectional view taken along line 6—6 in FIG. 5.

FIG. 7 is a perspective view of the area indicated by arrow 7 in FIG. 4.

FIG. 8 is a perspective view taken in the direction of arrow 8 in FIG. 7 with parts broken away.

FIG. 9 is a cross sectional view taken along line 9—9 in FIG. 8 with parts broken away.

Similar reference characters denote corresponding features consistently throughout the attached drawings.

DETAILED DESCRIPTION OF THE PREFERRED EMBODIMENTS

Figure 1:
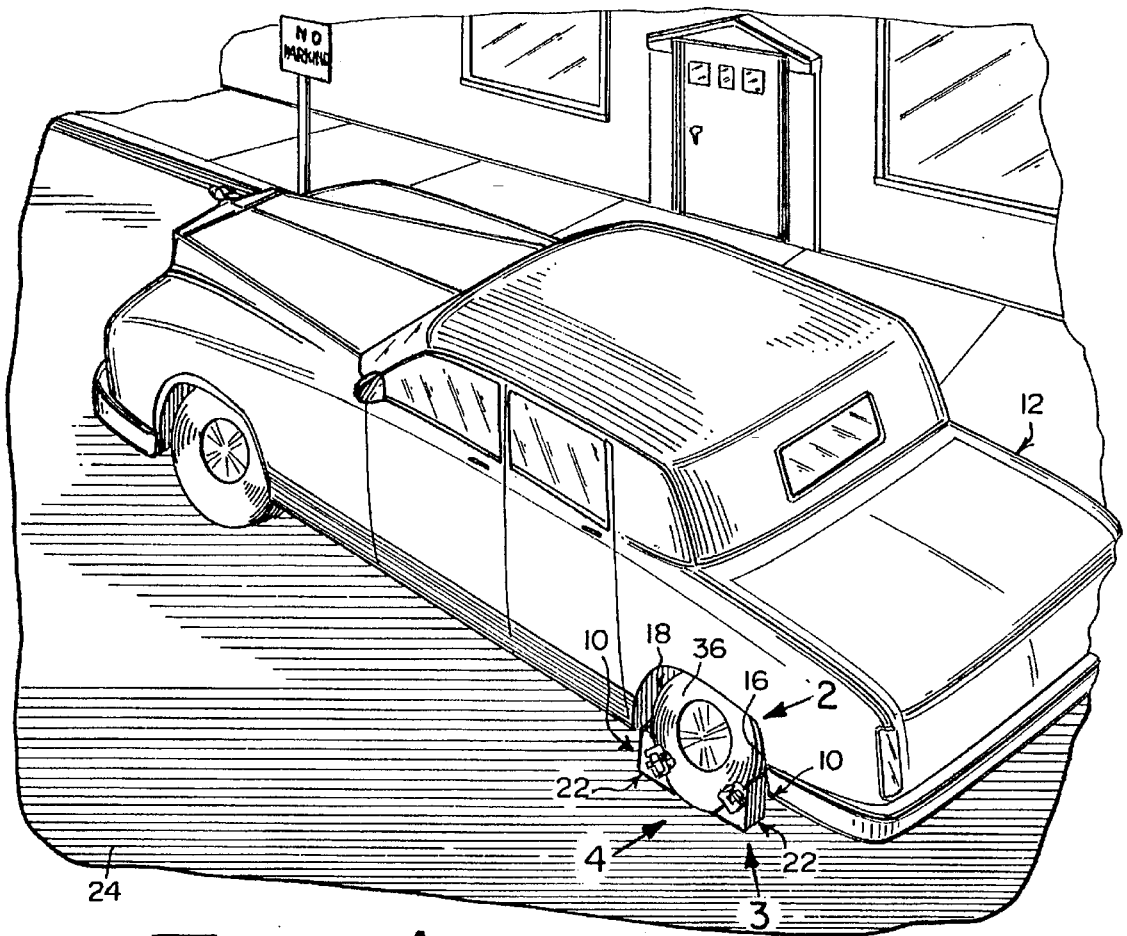
FIG. 1 is a rear perspective view of a motor vehicle, showing two of the instant inventions installed on a tire of the motor vehicle.
Figure 2:
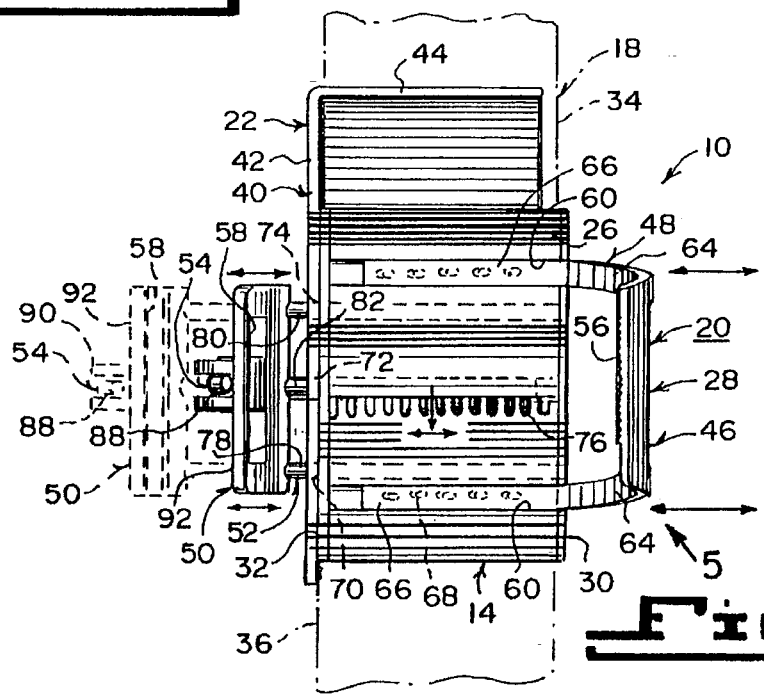
FIG. 2 is a top view of the instant invention per se taken in the direction of arrow 2 in FIG. 1.
Figure 3:
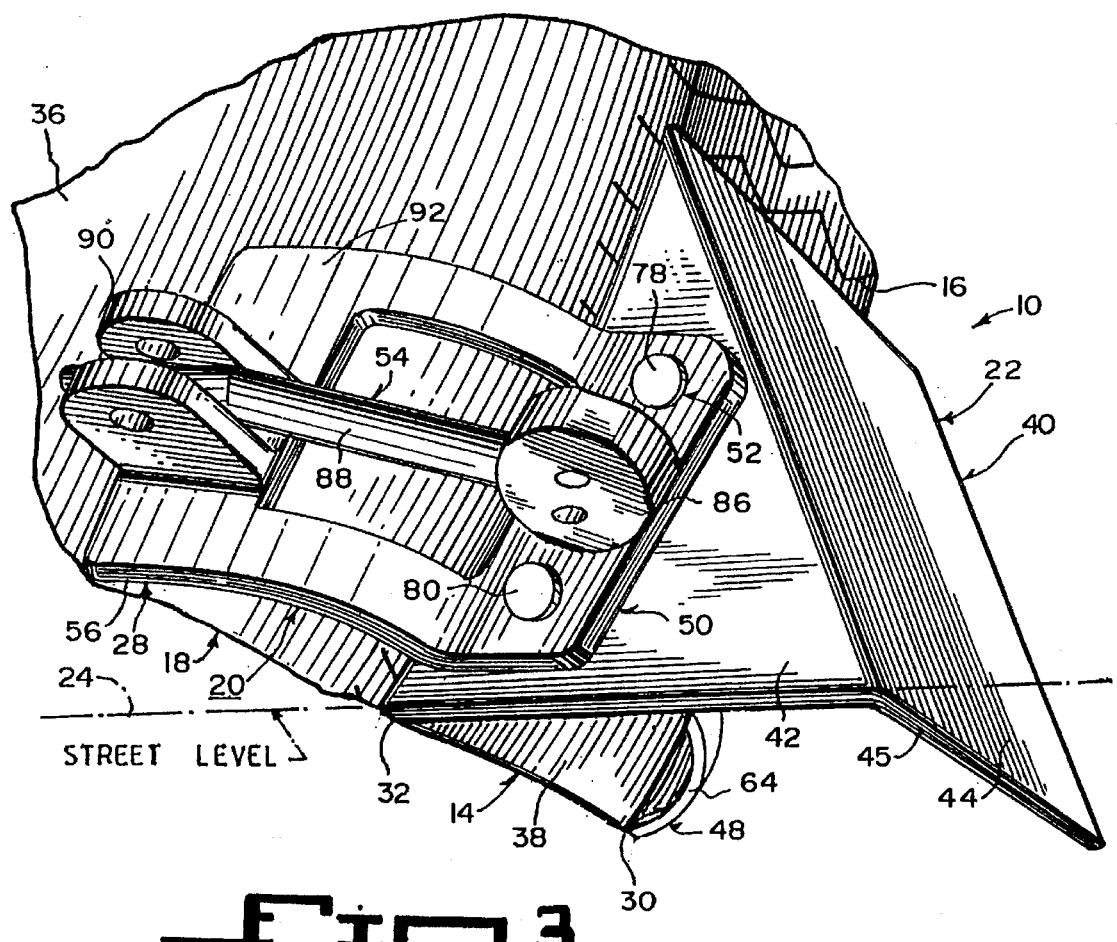
FIG. 3 is a perspective view taken in the direction of arrow 3 in FIG. 1, with the tire broken away.
Figure 4:
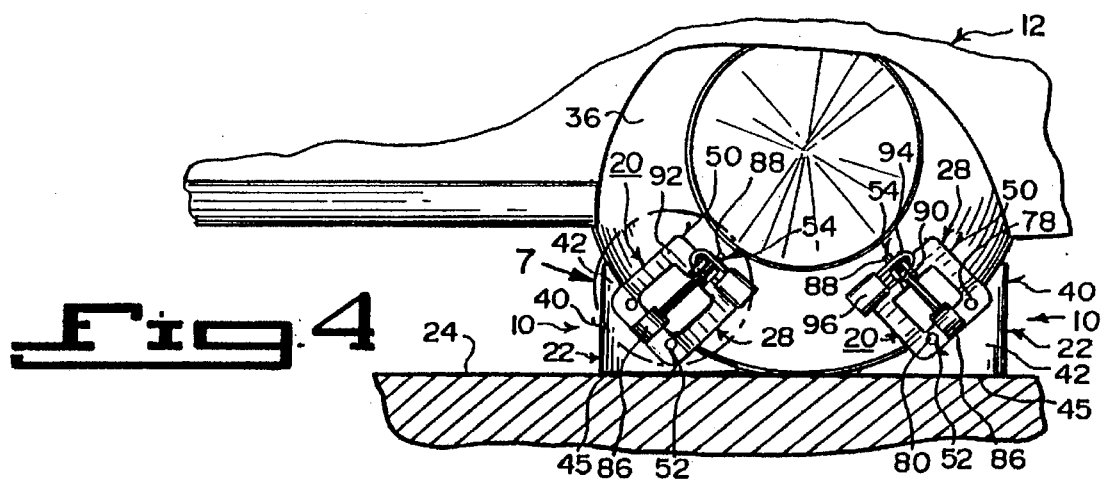
FIG. 4 is a side view taken in the direction of arrow 4 in FIG. 1, with the motor vehicle broken away.

Turning now descriptively to the drawings, in which similar reference characters denote similar elements throughout the several views, FIGS. 1 through 9 illustrate an antitheft device 10 for a motor vehicle 12, comprising a base 14 adapted to rest longitudinally upon a tread 16 of a tire 18, on the motor vehicle 12. A facility 20 is for securing the base 14 to the tire 18. A structure 22 is connected between the base 14 and the securing facility 20, for retaining the tire 18 in a stationary position upon a road surface 24, so that the tire 18 will not rotate, to prevent the motor vehicle 12 from being driven away. For best results, two antitheft devices 10 should be installed on the tire 18, as shown in FIGS. 1 and 4.

The base 14 includes a slightly curved inner concave surface 26 to best fit up against the tread 16 of the tire 18. The slightly curved inner concave surface 26 of the base 14 is serrated to better grip and prevent slippage of the base 14 on the tread 16 of the tire 18.

The securing facility 20 is an adjustable clamp assembly 28 extending from longitudinal sides 30, 32 of the base 14, so as to hold onto the side walls 34, 36 of the tire 12. The base 14 also includes a curved outer convex surface 38. The retaining structure 22 is a right angle triangular shaped structure. Bracket 40 has a first side wall 42 and a second side wall 44. One edge 45 of the first side wall 42 and the second side wall 44 will rest upon the road surface 24.

The adjustable clamp assembly 28 contains a rear jaw 46. A unit 48 on the first longitudinal side 30 of the base 14, is for adjusting in a retained coarse manner the rear jaw 46. A front jaw 50 is also provided. A unit 52 on the second longitudinal side 32 of the base 14 is for adjusting in a retained normal manner the front jaw 50. A unit 54 on the second longitudinal side 32 of the base 14, for adjusting in a retained fine manner the front jaw 50, so that the rear jaw 46 and the front jaw 50 will butt up against the opposite side walls 34, 36 of the tire 18.

The rear jaw 46 includes an inner concave surface 56, to conform to the rear side wall 34 of the tire 18. The front jaw 50 includes an inner concave surface 58 to conform to the front side wall 36 of the tire 18. The inner concave surface 56 of the rear jaw 46 is serrated to better grip and prevent slippage on the rear side wall 34 of the tire 18. The inner concave surface 58 of the front jaw 50 is serrated to better grip and prevent slippage on the front side wall 36 of the tire 18.

The coarse adjusting unit 48 consists of the slightly curved inner concave surface 26 of the base 14 having a pair of spaced apart transverse grooves 60 extending from the first longitudinal side 30. Each groove 60 has a plurality of forwardly angled holes 62 therealong. The rear jaw 46 has a pair of spaced apart curved arms 64. Each arm 64 has a straight portion 66 sized to fit into one groove 60. Each straight portion 66 has a plurality of forwardly angled fingers 68 therealong, to adjustably snap fit into said forwardly angled holes in said matching groove.

The normal adjusting unit 52 includes the base 14 having three spaced apart transverse apertures 70, 72, 74 extending from the second longitudinal side 32. The second middle aperture 72 has a plurality of spaced apart transverse side slots 76. A pair of guide pins 78, 80 extend from the front jaw 50 through the first wall 42 of the right angle triangular shaped bracket 40, into the first and third transverse apertures 70, 74 in the base 14 in an adjustable manner. A shaft 82 extends through the front jaw 50 through the first wall 42 of the right angle triangular shaped bracket 40 and into the second middle aperture 72 in an adjustable manner. A plurality of spaced apart stub posts 84 are on the shaft 82. When the shaft 82 is rotated ninety degrees, the stub posts 84 will enter and engage with the transverse side slots 76 to lock the shaft 82 into position.

The fine adjusting unit 54 contains a pivot cam 86 rotatively connected off center to an outer distal end of the shaft 82. A lever 88 is connected to the pivot cam 86. When the lever 88 is rotated against the front jaw 50, the pivot cam 86 will gently press against the front jaw 50, to allow the front jaw to apply a pre-determined amount of pressure against the front side wall 36 of the tire 18, to retain the base 14 in place and to prevent the side wall of the tire 12 from being dislodged from the tire 12.

The front jaw 50 includes a pair of spaced apart lugs 90 extending from an outer surface 92 between the lever 88, when the lever is rotated against the front jaw 50. A shackle 94 of a padlock 96 can engage with the lugs 90 to lock the lever 88 in place against the front jaw 50.

LIST OF REFERENCE NUMBERS 10 antitheft device
12 motor vehicle
14 base of 10
16 tread of 18
18 tire of 12
20 securing facility of 10
22 retaining structure of 10
24 road surface
26 slightly curved inner concave surface of 14
28 adjustable clamp assembly
30 first longitudinal side of 14
32 second longitudinal side of 14
34 rear side wall of 18
36 front side wall of 18
38 greater curved outer convex surface of 14
40 right angle triangular shaped bracket for 22
42 first side wall of 40
44 second side wall of 40
46 rear jaw
48 coarse adjusting unit on 30
50 front jaw
52 normal adjusting unit on 32
54 fine adjusting unit on 32
56 inner concave surface of 46
58 inner concave surface of 50
60 transverse groove in 26
62 forwardly angled hole in 60
64 curved arm
66 straight portion of 64
68 forwardly angled finger on 66
70 first transverse aperture in 14
72 second transverse aperture in 14
74 third transverse aperture in 14
76 transverse side slot in 72
78 guide pin into 70
80 guide pin into 74
82 shaft into 72
84 stub post on 82
86 pivot cam on 82
88 lever
90 lug on 92
92 outer surface of 50
94 shackle of 96
96 padlock It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An anti-theft device for a tire on a driven wheel of a motor vehicle, comprising:
   a base adapted for resting longitudinally upon a thread of a tire;
   a rear jaw disposed for engaging a rear side wall of the tire;
   a front jaw spaced from, and juxtaposed to, said rear jaw and disposed for engaging a front side wall of the tire, said base extending between said rear jaw and said front jaw, substantially in a plane extending substantially perpendicularly to both said rear jaw and said front jaw;
   a pulling shaft lying substantially in said plane of said base and penetrating through at least one of said rear jaw and said front jaw; and,
   means for tightening said pulling shaft so that said rear jaw and said front jaw move closer to one another for tightly gripping said tire said pulling shaft having a lever and a pivot cam pivoted thereto along a pivot axis which is perpendicularly connected to the pulling shaft and off center relative to an outer periphery of the cam, which periphery of the cam abuts against an outer surface of the front jaw when the lever and cam are pivoted to move the jaws closer to one another.

2. The anti-theft device according to claim 1, further comprising a lug for locking said lever.

3. The anti-theft device according to claim 1, wherein said base includes traverse side slots and said pulling shaft includes stub posts thereon for engaging the transverse side slots.

4. An anti-theft device for a motor vehicle, comprising:
   a) a base adapted for resting longitudinally upon a thread of a tire of a motor vehicle, said base having a slightly curved inner concave surface;
   b) means for securing said base to the tire, said means for securing comprising an adjustable clamp assembly extending from longitudinal sides of said base for holding onto side walls of the tire, thereby applying pressure against both sides of the tire for securing said anti-theft device to said tire, said adjustable clamp assembly, including:
      a rear jaw;
      means on a first longitudinal side of said base for adjusting, in a retained coarse manner, said rear jaw;
      a front jaw;
      means on a second longitudinal side of said base for adjusting, in a retained normal manner, said front jaw; and,
      means on said second longitudinal side of said base, for adjusting in a retained fine manner, said front jaw so that said rear jaw and said front jaw will butt up against opposite side walls of the tire,
      said coarse adjusting means including said slightly curved inner concave surface of said base having a pair of spaced apart transverse grooves extending from said first longitudinal side, each of said grooves having a plurality of forwardly angled holes therealong, said rear jaw having a pair of spaced apart curved arms, with each of said arms having a straight portion sized for fitting into one of said grooves, and each of said straight portions having a plurality of forwardly angled fingers therealong for adjustably fitting into said forwardly angled holes in a matching groove; and,
   c) means connected between said base and said securing means for retaining the tire in a stationary position upon a road surface, so that the tire will not rotate thereby preventing the motor vehicle from being driven away.

5. The anti-theft device according to claim 4, wherein said slightly curved inner concave surface of said base is serrated for better gripping and preventing slippage of said base on a tread of the tire.

6. The anti-theft device according to claim 4, wherein said base includes a curved outer convex surface.

7. The anti-theft device according to claim 4, wherein said retaining means includes a right-angle triangular-shaped bracket, having a first side wall and a second side wall, wherein one edge of said first side wall and said second side wall will rest upon the road surface.

8. The anti-theft device according to claim 4, wherein said rear jaw includes an inner concave surface for conforming to a rear side wall of the tire.

9. The anti-theft device according to claim 8, wherein said inner concave surface of said rear jaw is serrated for better gripping and preventing slippage on the rear side wall of the tire.

10. The anti-theft device according to claim 4, wherein said front jaw includes an inner concave surface for conforming to a front side wall of the tire.

11. The anti-theft device according to claim 10, wherein said inner concave surface of said front jaw is serrated for better gripping and preventing slippage on said front side wall of the tire.

12. The anti-theft device according to claim 4, wherein said front jaw includes a pair of spaced apart lugs extending from an outer surface for a lever when said lever is rotated against said front jaw, so that a shackle of a padlock can engage with said lugs for locking said lever in place against said front jaw.

13. An anti-theft device for a motor vehicle, comprising:
   a) a base adapted for resting longitudinally upon a thread of a tire of a motor vehicle, said base having a slightly curved inner concave surface;
   b) means for securing said base to the tire, said means for securing comprising an adjustable clamp assembly extending from longitudinal sides of said base for holding onto side walls of the tire, thereby applying pressure against both sides of the tire for securing said anti-theft device to said tire, said adjustable clamp assembly, including:
      a rear jaw;
      means on a first longitudinal side of said base for adjusting, in a retained coarse manner, said rear jaw;
      a front jaw;
      means on a second longitudinal side of said base for adjusting, in a retained normal manner, said front jaw; and,
      means on said second longitudinal side of said base, for adjusting in a retained fine manner, said front jaw so that said rear jaw and said front jaw will butt up against opposite side walls of the tire,
      said normal adjusting means including said base having three spaced apart transverse apertures extending from said second longitudinal side, a second middle aperture having a plurality of spaced apart transverse side slots, a pair of guide pins extending from said front jaw through a first side wall of a right-angle triangular-shaped section, into first and third transverse apertures in said base in an adjustable manner, and a shaft extending through said front jaw through said first side wall of said right-angle triangular-shaped section and into said second middle aperture in an adjustable manner; and,
   c) means connected between said base and said securing means for retaining the tire in a stationary position upon a road surface, so that the tire will not rotate thereby preventing the motor vehicle from being driven away.

14. The anti-theft device according to claim 13, wherein said slightly curved inner concave surface of said base is serrated for better gripping and preventing slippage of said base on a tread of the tire.

15. The anti-theft device according to claim 13, wherein said base includes a curved outer convex surface.

16. The anti-theft device according to claim 13, wherein said retaining means includes a right-angle triangular-shaped bracket, having a first side wall and a second side wall, wherein one edge of said first side wall and said second side wall will rest upon the road surface.

17. The anti-theft device according to claim 13, wherein said rear jaw includes an inner concave surface for conforming to a rear side wall of the tire.

18. The anti-theft device according to claim 17, wherein said inner concave surface of said rear jaw is serrated for better gripping and preventing slippage on the rear side wall of the tire.

19. The anti-theft device according to claim 13, wherein said front jaw includes an inner concave surface for conforming to a front side wall of the tire.

20. The anti-theft device according to claim 19, wherein said inner concave surface of said front jaw is serrated for better gripping and preventing slippage on said front side wall of the tire.

21. The anti-theft device according to claim 13, wherein said front jaw includes a pair of spaced apart lugs extending from an outer surface for a lever when said lever is rotated against said front jaw, so that a shackle of a padlock can engage with said lugs for locking said lever in place against said front jaw.

22. An anti-theft device for a motor vehicle, comprising:
  a) a base adapted for resting longitudinally upon a thread of a tire of a motor vehicle, said base having a slightly curved inner concave surface;
  b) means for securing said base to the tire, said means for securing comprising an adjustable clamp assembly extending from longitudinal sides of said base for holding onto side walls of the tire, thereby applying pressure against both sides of the tire for securing said anti-theft device to said tire, said adjustable clamp assembly, including:
  a rear jaw;
  means on a first longitudinal side of said base for adjusting, in a retained coarse manner, said rear jaw;
  a front jaw;
  means on a second longitudinal side of said base for adjusting, in a retained normal manner, said front jaw; and,
  means on said second longitudinal side of said base, for adjusting in a retained fine manner, said front jaw so that said rear jaw and said front jaw will butt up against opposite side walls of the tire,
  said fine adjusting means includes a pivot cam rotatively connected off center to an outer distal end of a shaft, and a lever connected to said pivot cam, so that when said lever is rotated against said front jaw, said pivot cam will press against said front jaw for allowing said front jaw to apply a pre-determined amount of pressure against a front side wall of the tire for retaining said base in place; and,
  c) means connected between said base and said securing means for retaining the tire in a stationary position upon a road surface, so that the tire will not rotate thereby preventing the motor vehicle from being driven away.

23. The anti-theft device according to claim 22, wherein said slightly curved inner concave surface of said base is serrated for better gripping and preventing slippage of said base on a tread of the tire.

24. The anti-theft device according to claim 22, wherein said base includes a curved outer convex surface.

25. The anti-theft device according to claim 22, wherein said retaining means includes a right-angle triangular-shaped section, having a first side wall and a second side wall, wherein one edge of said first side wall and said second side wall will rest upon the road surface.

26. The anti-theft device according to claim 22, wherein said rear jaw includes an inner concave surface for conforming to a rear side wall of the tire.

27. The anti-theft device according to claim 26, wherein said inner concave surface of said rear jaw is serrated for better gripping and preventing slippage on the rear side wall of the tire.

28. The anti-theft device according to claim 22, wherein said front jaw includes an inner concave surface for conforming to said front side wall of the tire.

29. The anti-theft device according to claim 28, wherein said inner concave surface of said front jaw is serrated for better gripping and preventing slippage on said front side wall of the tire.

30. The anti-theft device according to claim 22, wherein said front jaw includes a pair of spaced apart lugs extending from an outer surface for said lever when said lever is rotated against said front jaw, so that a shackle of a padlock can engage with said lugs for locking said lever in place against said front jaw.

* * * * *